Jan. 9, 1940.　　　　J. W. HALE　　　　2,186,334
CHANGE SPEED SYSTEM
Filed June 18, 1934　　　3 Sheets-Sheet 1
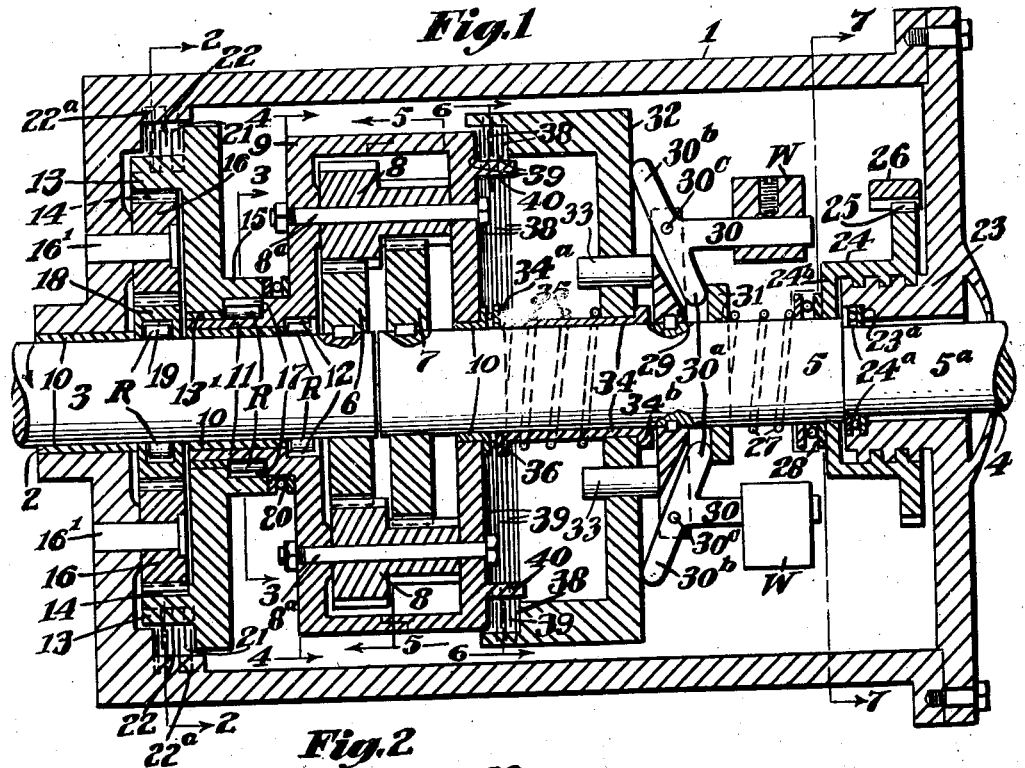
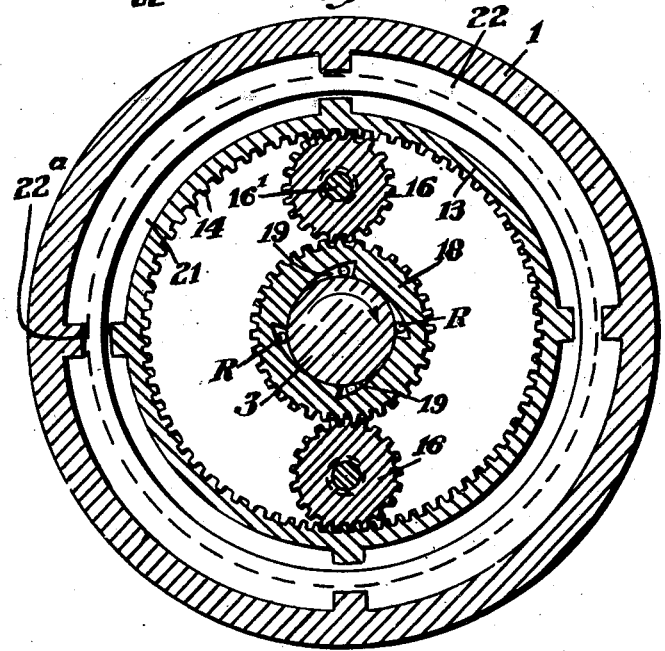
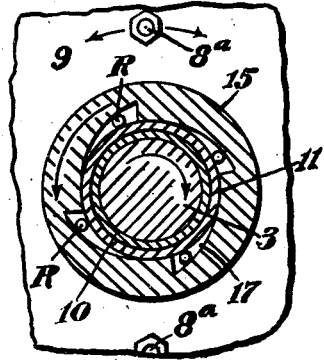
Inventor
Jesse W. Hale
By Ellis Spearf
Attorney

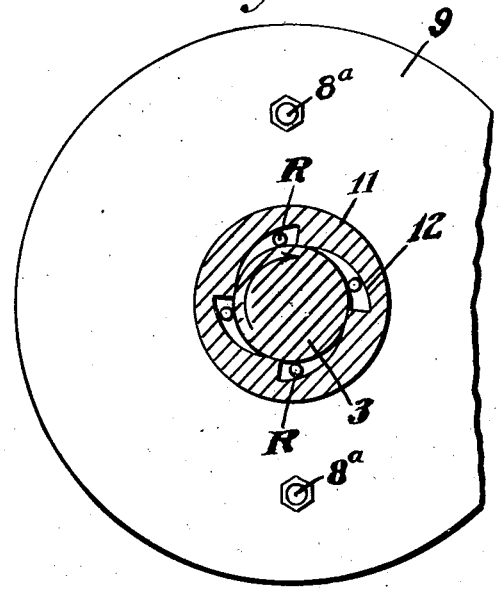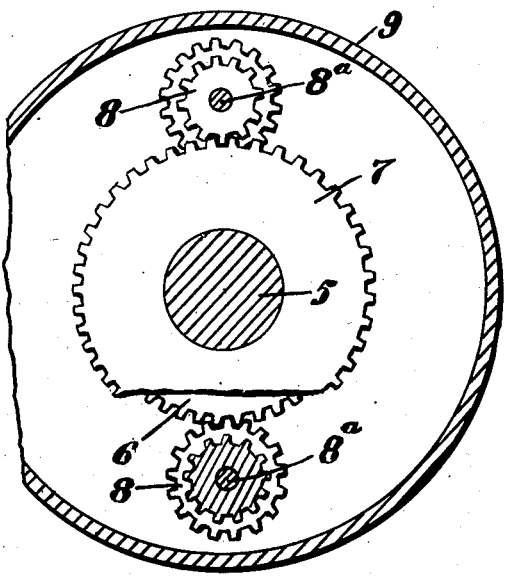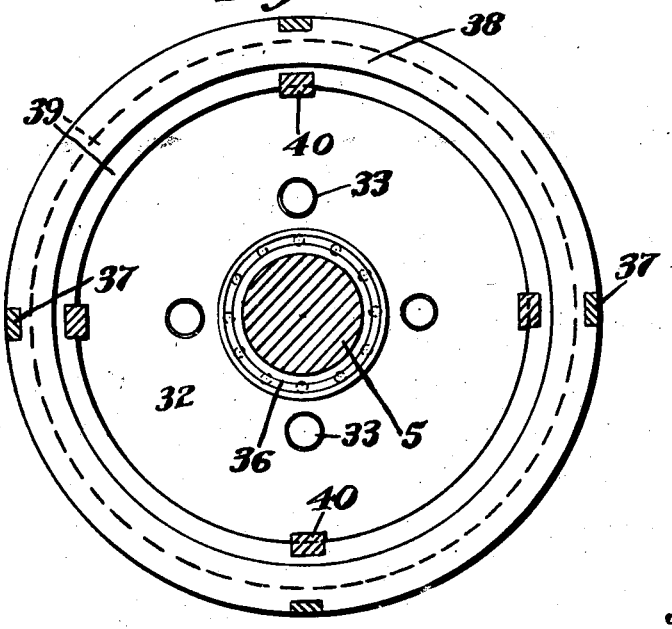

Jan. 9, 1940.  J. W. HALE  2,186,334
CHANGE SPEED SYSTEM
Filed June 18, 1934  3 Sheets-Sheet 3
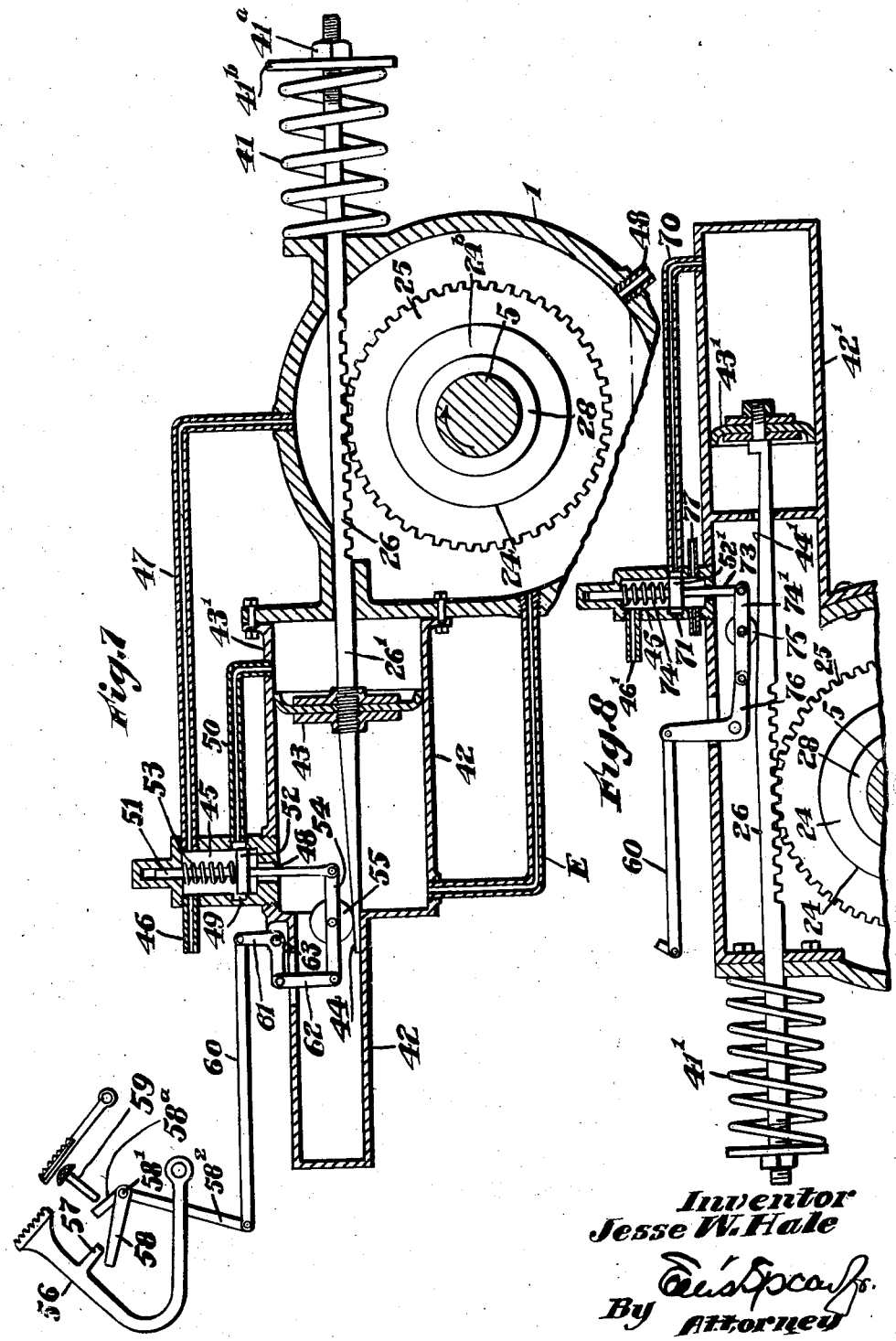
Inventor
Jesse W. Hale
By [signature]
Attorney Patented Jan. 9, 1940

2,186,334

UNITED STATES PATENT OFFICE 2,186,334

CHANGE SPEED SYSTEM

Jesse W. Hale, Newton Center, Mass.

Application June 18, 1934, Serial No. 731,089

38 Claims. (Cl. 74—260)

This invention relates to change speed devices in which the gear ratio between the driving shaft and the driven shaft is automatically adjusted to give the speeds required by operating conditions, as well as afford both rapid acceleration and deceleration.

Many attempts have been made to provide for mechanism of this character and some of these have had a measure of success. Certain difficulties, however, always have been encountered that have prevented any wide adoption of such mechanisms.

These difficulties constitute the problems of varied nature that accompany the provisions of change speed units that should have simplicity and strength, and yet permit of a flexibility of operation, as in the case of motor vehicles, that may be characterized as responsive to the will of the operator under varying traffic conditions, so that acceleration and deceleration, while essentially automatic, are still subject to and under the control of the operator.

My concept solves the problem, broadly suggested above, by providing for a change speed system somewhat in line with my prior developments as presented in my previous applications, Serial No. 674,529, filed June 6, 1933, and Serial No. 683,918, filed August 7, 1933.

One of the improvements to be noted at the outset in my present invention is that the governor effects gear shifting and is itself dominated, for example, by fluid pressure or vacuum, whereas in prior units the governor dominated the fluid or electric controls which effected change in the gear ratio.

The advantages and improvements of my present invention will be apparent from the accompanying specification and drawings in which I have shown an illustrative embodiment. No effort has been made to go into exact detail of construction and assembly as the ultimate design and assembly of parts will necessarily have to be determined by the character of the service for which the device is employed.

Throughout specification and drawings like reference numerals are employed to indicate corresponding parts, and in the drawings:

Fig. 1 is a view in longitudinal section of a gear system and controls in accordance with my invention.

Fig. 2 is a transverse section indicated on the line 2—2 of Fig. 1.

Fig. 3 is a fragmentary section taken on the line 3—3 of Fig. 1.

Fig. 4 is a broken view partly in section on the line 4—4 of Fig. 1.

Fig. 5 is a section indicated on the line 5—5 of Fig. 1 but partly broken away to expose gearing.

Fig. 6 is another transverse section indicated on the line 6—6 of Fig. 1.

Fig. 7 is a somewhat schematic presentation of a fluid control for my gear system, and Fig. 8 is a similar view of a vacuum control for like purpose.

The gear transmission system as indicated in the accompanying drawings may be provided with a housing 1 having an axial port 2 at one end for the drive shaft 3, and a second axial port 4 at the other end for the driven shaft 5.

Fixed on the drive shaft 3 is a gear 6 and similarly fixed to the driven shaft 5 is a gear 7, both in mesh with a differential step gear 8 shown as slidably and rotatably mounted on the shaft 8ª in the gear casing 9 which shaft may be considered as an assembly bolt for the casing parts. The gear casing 9 is provided with an annular hub 11. Bushings are indicated at 10 for the hub 11 and shafts 3 and 5.

Within the hub 11 is a clutch member 12 shown as of conventional roller type R, as suggested in Figs. 2, 3, and 4. As long as the casing 9 is rotated oppositely to the drive shaft 3 or at the same or lesser speed, the rollers R will travel with the casing hub 11 freely over the shaft 3, but if the casing 9 tends to reverse its direction of travel, or its speed of rotation tends to become faster than that of the shaft, the clutch 12 acts to prevent such motion or reduces the speed of the casing to the speed of the shaft. The part played by this clutch 12, as well as the one-way clutches 17 and 19, later to be described, will be more fully set forth in connection with the description of the operation of my change speed transmission system.

An internal rim gear member 13 having teeth 14 meshes with idler pinion gears 16 mounted on studs 16' on the casing 1, and including an annular hub 15, rotates on an indicated bushing 13' on the hub 11 of the casing 9. The hub 15 encloses a second one-way clutch 17 (see Fig. 3) of the same general construction as the first clutch 12, which is provided to lock the casing 9 through the hub 11 to the gear 13 through the annular hub 15 so long as the casing 9 is rotated in a direction opposite to that of the shaft 3, as will be further described in connection with a full discussion of the operation of my device.

The idlers 16 which are rotated by the gear teeth 14, mesh with a gear 18 which is free on the shaft 3, and serve to rotate the gear 18 (when in operation) in the same direction as the drive shaft 3. The gear 18 is provided with an indicated one-way clutch 19 which locks the gear 18 on the shaft 3 when its speed of rotation tends to be greater than that of the shaft 3.

The locking of the gear 18 by the clutch 19 establishes a reverse direction trend of the idler assembly, gear case 9 and step gear 8 depending upon relative speeds. The ratio of gears 13 and 18 may be assumed to be for example on a 4 to 1 ratio, which with a drive speed of 400 revolutions per minute would provide one hundred revolutions per minute of the gear 13. Assuming that the ratio between the gears 6, 7 and 8 be, for example, two to one, and the connected parts be stationary, the speed of the driven shaft would be two hundred revolutions per minute. But with the assembly, gear casing 9 and step gear 8 now rotating reversely one hundred revolutions per minute, the ultimate speed of the driven shaft 5 will be one hundred revolutions per minute or a total ratio of four to one between driving shaft 3 and driven shaft 5.

The rim gear member 13 carries on its outer surface annular clutch discs 21 adapted to engage with similar discs 22 mounted in shoulder blocks 22ª on the casing 1. The annular hub 15 on the gear 13 and the casing 9 are spaced by thrust bearings indicated at 20.

The gear member 13 may be moved longitudinally of the shaft 3 with the gear casing 9 and thereby effect an interlock of the discs 21 and 22 as hereinafter described, whereupon the casing 9 will be held stationary to establish a two to one ratio, potentially in the gear system. With this connection the indicated one-way clutch 19 which held the gear 18 is released, permitting free rotation of the drive shaft 3 within the gear 18.

Carried by the shaft 5 is a governor frame 29 which pivotally supports the weight arms 30. These are shown as of an inclined T-type of bell crank. They include an arm 30ª contacted by a ring 31 slidable on the shaft 5 under the influence of the spring 27, and an arm 30ᵇ bearing against the face plate 32 which is slidably carried by the studs 33 of the governor frame 29, longitudinally of the shaft 5. (See Fig. 1.)

The adjustable governor weights W, are set normally to hold the arms 30ª and 30ᵇ in easy engagement with the faces of the ring 31 and plate 32. On increasing rotation of the shaft 5 the weights W are thrown outwardly and the arms 30ª and 30ᵇ bear with increasing force on the ring 31 and plate 32 against the action of the springs 27 and 35.

The face plate 32, as indicated in Fig. 1, is bushed as at 34. The bushing is upset at its ends as at 34ª and 34ᵇ to hold the spring 35 and plate 32 in an assembly. The flanged end 34ª is made part of a thrust bearing 36 between the spring 35 and the casing 9. The face plate 32 with its outer annular member 37 carries at its ends annular clutch plates 38 disposed to engage the clutch plates 39 on the shoulders 40 on the casing 9.

The spring 35 tends to hold the plate 32 tightly against the bushing end 34ᵇ. The initial force exerted by the governor on the plate 32 tends to slide the gear assembly on the shaft 3 until the clutch discs 21 and 22 are interengaged, whereupon the casing 9 is locked against further rotation with the drive shaft.

Any further increase in speed would force the plate 32 against the spring 35 to lock the clutch plates 38 on the plate 32 and clutch plates 39 on the gear casing 9, whereupon the casing 9 would be locked to and rotate with the driven shaft 5, establishing a direct drive. At such a phase, the member 15 of the gear 13 may be running free relative to the gear casing 9 by reason of the accommodation of the clutch 17.

While in normal operation, the idler assembly of gear casing 9 and gear 8 would rotate at its established speed with regard to the drive shaft 3, there may be a tendency for it to run ahead of the drive shaft and to prevent this the over-running clutch 12 locks the casing 9 to the drive shaft.

The mechanism just suggested will automatically change the gear ratios between the drive and driven shafts to provide successively first, second and third or high speeds.

*Operation of gear transmission mechanism*

After the motor has been started and the main clutch (not shown) engaged, the shaft 3 begins to rotate. Because of the drag on the driven shaft 5, the gear 8 will travel around the gear 7, and the casing 9, which is free to rotate with it, will be rotated in a direction opposite to that of the rotation of the drive shaft 3.

Assuming that the gear ratio is 2 to 1, the casing 9 will rotate reversely once to every two revolutions of the shaft 3. The one-way clutch 17 between the hub of the casing 9 and the gear 13 provides an interlock of the casing 9 and gear 13, which gear through the meshing idler pinions 16 will rotate the gear 18 about and in the same direction as the shaft 3.

For illustration in operation, the ratio between the gears 13, 16 and 18, as above suggested, may be assumed to be 4 to 1, that is, one rotation of the gear 13 will rotate the gear 18 four times. As the gear 13 is now assumed to be locked to the casing 9 and gear 8 by the clutch 17, it bears the same relation with respect to the shaft 3, that is, 1 to 2, or one revolution of the gear 13 to every two revolutions of the shaft 3 when the same is free to rotate.

The speed of the casing 9 relative to the shaft 3, on the assumed basis, through the gears 13 and 18, is decreased to 1 to 4 when the clutch 19 becomes effective and locks the gear 18 to the shaft 3, and thereupon the rotation of the driven shaft is effected at a 4 to 1 ratio.

As the assumed speed of the driven shaft 5 increases, the weight elements W of the governor 29 tend to swing outwardly and the arm portion 30ᵇ bears against the plate 32 with increasing urge. Because of the resistance of the spring 35, this tends first to move the casing 9 and the gear 13 longitudinally on the shaft 5, until the clutch plates 20 and 21 are engaged to hold the gear 13 and with it the idler pinions 16 and gear 18 against rotation, the clutches 38—39 being held apart by tension of spring 35.

Since the gear 18 is now assumed to be motionless, the one-way clutch 19 will be disengaged from the shaft 3, and the one-way clutch 17 which will still connect the gear 13 and casing 9, locks the casing against further movement opposite to the rotation of the shafts, and the gears 6, 7 and 8 operate to rotate the driven shaft 5 once on every two rotations of the drive shaft 3 to effect a suitable second speed.

Increased speed of the driven shaft 5 will result in increased pressures from the governor 29 on the plate 32 until the resistance of the spring 35 is overcome, thus engaging the clutch plates 38 on the face plate 32 and clutch plates 39 on the casing 9. This will lock the casing 9 to the plate 32 so that it will rotate with the driven shaft 5, whereupon a direct drive between driving and driven shafts results.

This opposite direction of rotation of the casing 9 disengages the one-way clutch 17 and the casing 9 is freed from the gear 13. As above pointed out, the one-way clutch 12 prevents the casing 9 from rotating faster than the drive shaft 3.

In this connection, it is to be noted that the one-way clutches 17 and 19 also serve to prevent free rotation of the driven shaft 5 in the opposite direction by successively locking the housing 9 to the gear 13 and the gear 13 to the shaft 3, thus providing means of retarding backward movement of the vehicle if the engine is used as a brake. It will be noted that my device may be utilized with the shaft 5, the drive shaft, and the shaft 3, the driven shaft. This condition is of course that which occurs when the vehicle is moving at a speed greater than that permitted by the engine speed. This condition may be utilized when desired.

While I have established three definite forward speeds, it will be appreciated that due to the ensured supply of lubrication, these speeds are not definitely established until the oil is eliminated from the clutch plates. While the pressure on the discs is of importance, centrifugal force effects a variable hydraulic clutching both in retarding the reverse rotation of the assembly and in rotating the assembly with the shafts.

Driver's control mechanism

The mechanism above described provides for a gradual shifting of gears, but this is necessarily fixed, being dependent on shifting at determined speeds of the driven shaft. In order to provide for more rapid acceleration I contemplate control mechanism to delay the normal operation of the governor so that shifting may be effected at higher speeds of the driven shaft.

The control mechanisms indicated should be so designed that the governor, despite acceleration of the driven shaft, is delayed in forcing the casing 9 into position to interlock the clutch plates 21 and 22 as indicated to produce second speed gear assembly or into position to interlock the clutch plates 38 and 39 for high speed assembly.

A vehicle equipped with a system in accordance with my invention may be slowed down as well as speeded up by retarding the automatic action of the governor as the gears will shift back at relatively higher speeds of the driven shaft. The high speed connection through the clutch plates 38 and 39 is first broken and next the second speed connection at 21 and 22.

The mechanism by which I effect control of the governor is as follows: A threaded hub 23 on the driven shaft end of the housing 1, as shown in Fig. 1, surrounds the driven shaft 5. On this is screwed a thrust member 24 which is moved to increase or decrease the tension of the spring 27 on the ring 31 against which the arm 30ª of the governor bears. The shaft 5 is reduced at 5¹ to form a shoulder and the hub 23 has an opposed shoulder 23ª between which and the shaft shoulder 5ª is positioned a thrust bearing 24ª.

The thrust member 24 is formed with a gear 25 in mesh with a rack 26 extending transversely of the casing 1 (see Figs. 7 and 8). The thrust member 24 is also provided with an apertured overhang 24ᵇ and between it and the spring 27 is a thrust bearing 28.

The degree of pressure or thrust of the spring 27 on the ring 31 is varied by the rack teeth acting on the gear 25 on the thrust member 24 to decrease or increase the compression on the spring 27 which correspondingly vary the functioning of the governor.

I have suggested in the drawings (Figs. 7 and 8) two systems for imparting movement to the rack to vary the compression of the spring 27 on the governor 29. I contemplate the use of fluid pressure (Fig. 7) or vacuum (Fig. 8) to effect this, but as the structures differ in certain details I shall describe them separately except as to their function which is similar in both cases.

When the fluid control of Fig. 7 is used, the rack 26, which is therein shown as extending through the casing 1, is normally held to the right of that figure by the spring 41. The compression of the spring 41 may be adjusted by a nut 41ª which holds the thrust disc 41ᵇ. This tends to hold the rack in its position in which it permits governor control. The operator control mechanism for overcoming the governor action in the case of the pressure system (Fig. 7) acts against the spring 41.

Beyond the toothed portion of the rack is carried a piston 43 which moves the rack against the action of the spring 41 under suitable pressure and the rack from there on is tapered as at 44. This toothless portion of the rack bar is guided within a cylinder 42 to which is connected a valve chamber 45 for the valve 52 which controls the piston actuating means. The position of the valve in the chamber 45 will be controlled by the driver's acceleration and deceleration of the vehicle.

Oil is pumped, as from the crank case, through the supply 46 into the valve chamber 45 from which a pipe 47 conducts oil from the valve chamber into the casing 1 for lubrication. This pipe 47 also serves to ensure circulation of oil at working temperature. Oil is piped from the casing 1 as at 48 and drained back to the crank case.

The valve chamber 45 is recessed as at 49 and an oil conduit 50 leads from the recess 49 and discharges into the cylinder 42 behind the piston 43. A valve stem 51 carrying the piston valve 52 is mounted in the chamber 45, and a spring 53 bears against the piston valve 52 holding it and the fulcrum 55 on the tapered end 44 of the rack 26. At its lower end the stem 51 is pivotally connected to a link bar 54 fulcrumed on its roller 55 on the tapered end 44 of the rack bar 26.

An indicated brake pedal (left of Fig. 7) is formed with a lug 57 adapted to contact the bell crank lever 58. The lever 58 includes a portion 58ª adapted to be engaged by the accelerator or throttle control 59. An arm 58² of the bell crank 58 is connected by the link 60 to a second bell crank lever 61 fulcrumed at 63 and pivotally connected by the link 62 which in turn is pivoted to the link bar 54 carrying the roller 55 and to the other end of which the valve stem 51 is pivoted.

The valve 52 is actuated by the operator controls described above. When the valve 52 is moved downwardly, fluid under pressure is admitted through the supply conduit 50 into the cylinder 42 rearwardly of the piston 43. When the valve 52 is moved upwardly, fluid is free to escape so that the spring 41 will return the rack 26 to its normal position. The pressure of the oil forces the piston forward, moving the rack 26 on which it is mounted, and thereby rotating the gear 25 which in turn rotates the screw thrust member 24 (Fig. 1) increasing pressure on the spring 27 which forces the ring 31 against the governor arm 30ᵃ which removes pressure of the opposite arm 30ᵇ from the plate 32 and thereby retards the governor from operative connection with the gear casing 9 until the driven shaft 5 is rotating at a speed which would make the governor effective, by overcoming the increased resistance.

I may also, as an alternative method of control, utilize a vacuum controlled system to dominate the governor.

In this case, (Fig. 8), the rack is formed as has been formerly described with the inclined surface 44', but is mounted for movement opposite to that of its corresponding part in the fluid system just described. In the case of the fluid system, (Fig. 7), the spring 41 held the rack in governor operating position. In the proposed vacuum system, the spring 41' holds the rack in position to delay governor operation, and the vacuum is used to overcome this action of the spring 41' and produce normal governor operation. In such a system, vacuum is broken or reduced by acceleration or deceleration, and thereupon the spring 41' moves the rack out of the position which permitted governor operation.

The low vacuum may be conveniently secured by the suction from the manifold by any desired connection (not shown). Forwardly of the piston 43' (Fig. 8) is an air connection 70 leading from an annular recess 71 in the valve chamber 45 which has at its upper end a connection 46' from the intake manifold (not shown). This tends to exhaust air out of the cylinder 42' back of the piston 43' through the line 70 and valve chamber 45.

This vacuum is effective so long as the valve 52' is held downwardly and the passage 70 is open. In this condition, the spring 41' is prevented from moving the rack 26 to take the governor out of control. The vacuum is broken or lowered upon the depression of the accelerator 59 or brake 56. Either pedal through the connection 60 and bell crank 76 rocks the link lever 74' fulcrumed on its roller 75 and raises the valve stem 73 closing the connection 46' to the manifold (not shown) and connecting the cylinder 42' behind the piston 43' with the exhaust ports 77, whereupon the vacuum is broken and the spring 41' moves the rack bar 26 to operate the gear 25 and thrust member 24 to compress the spring 27 and move the ring 31 against the governor arm 30ᵃ tending to relieve the opposite governor arm 30ᵇ to provide a disengagement first of the clutch plates 38—39 and thus a reduction to second speed, and then a disengagement of clutch plates 21—22 and a reduction to low speed.

In both fluid pressure and vacuum systems, as the rack 26 is carried forward by the pistons 43—43', the inclined surface 44 of the rack 26 is carried under the roller 55, and this inclined surface holds the valve 52, in the case of the vacuum system, in position to break the vacuum, and, in the fluid system, in position to permit the oil to enter back of the piston; that is, in both cases the piston and rack are moved into position to delay governor action. In each case, when operator control ceases, the piston automatically is returned to position of least tension on governor, and the sloping surface 44 of the rack 26 in each instance is withdrawn and the rollers 55—75 resume their original positions. In each case, the sloping surface 44 of the rack 26 serves to permit the valve to operate in proportion to the distance that the rack 26 has been moved to effect increased tension on the governor with regard to position of accelerator.

My change speed device affords automatic gear shifting at varied stages of acceleration. Acceleration greater than the gear unit itself would normally permit is attained by reason of the operator's control mechanism. These mechanisms (Figs. 7 and 8) act to suspend the normal operation of the governor so that the shifting of gears will take place at relatively higher speeds. This permits as rapid acceleration as is desired. Likewise, when the brake of an automobile is applied, the gears will be automatically shifted into the next lower speed assembly at a higher rate of speed of the vehicle, dependent upon the applied pressure on the brake, so that the increased gear ratio resulting from the changed gear assembly, plus the engine, will aid in slowing or stopping the vehicle.

To provide for the condition after the car has accelerated and the normal action of the governor on the gears is desired, the rack 26 is formed with the inclined or wedge surface 44 over which the roller 55 travels to return the valve 52 to position so that the operating medium (fluid or vacuum) will always be free to repeat its function, and the position of the piston will always be relative to acceleration or brake pedal position. Thus, pressing the brake or accelerator tends to open or shut the valve 52 according to the particular system used. If it were not for the rack formation, the valves in both systems would not be in an operable position, but the rack lifts the roller 55 forcing the valve to its original position, after which, in the case of the fluid control, the fluid passes to relief through the ports 48 and exhaust pipe E, or in the vacuum system the connection to the manifold is reopened. Thus, only during periods of acceleration or deceleration by throttle or brake, respectively, are the control systems able to delay operation of the governor. By reason of this tendency of the governor to resume control of the speed transmission system, repeated accelerations are possible until after a certain predetermined speed is attained, from which point the governor will overcome any tension to keep the unit in high speed. Upon suitable applications of the brake, however, the operator controlled mechanisms will function to aid in slowing down of the speed as hereinbefore described.

What I therefore claim and desire to secure by Letters Patent is:

1. In a change speed device, a drive shaft and a driven shaft, a gear connection of desired ratio between said shafts, a gear casing rotatably and slidably mounted on said shafts, means cooperating with said casing to increase and decrease said gear ratio, a governor responsive to the speed of the driven shaft to slide said casing on said shafts to actuate said cooperating means whereby said gear ratio is automatically adjusted to produce desired speeds.

2. In a change speed device, a drive shaft and a driven shaft, a gear connection of desired ratio between said shafts, means rotatably and slidably mounted on said shafts and cooperating with said gear connection to increase and decrease the gear ratio, a governor responsive to the speed of the driven shaft to slide said means on said shafts whereby said gear ratio is automatically adjusted to the desired speeds, and driver controlled means for retarding the action of said governor.

3. In a change speed device, a fixed housing, a drive shaft and a driven shaft, a gear connection of desired ratio between said drive and driven shafts, means for increasing said gear ratio to give desired driven shaft speeds including a casing for said gears slidable and rotatable on said shafts, a speed controlled governor on said driven shaft and adapted to slide said casing on said shaft, a compressible member separating said casing and said governor, clutch plates on said housing adapted to be interlocked with said casing when said governor compels longitudinal movement of said casing, and clutch plates on said casing adapted to be interlocked with said governor when said governor compels further longitudinal movement of said casing and overcomes the resistance of said compressible member.

4. In a change speed device, a drive shaft and a driven shaft, a gear connection of desired ratio between said drive and said driven shaft, and means for increasing said gear ratio to give desired driven shaft speeds including a gear casing rotatably and slidably mounted on said shafts, a speed controlled governor mounted on said driven shaft and adapted to slide said casing on said shafts to vary said gear ratios, said governor comprising a member fixed on the driven shaft, a spring controlled plate longitudinally movable relative to said driven shaft and carried by said governor to casing engaging position, an arm pivoted on said fixed member and adapted to bear against said spring controlled plate, a weighted arm adapted upon predetermined speed of the driven shaft to force the face plate engaging arm against the plate to move the plate to slide the gear casing on said shaft.

5. In a change speed device, a drive shaft and a driven shaft, a gear connection of desired ratio between said drive and said driven shaft, and means for increasing said gear ratio to give desired driven shaft speeds including a gear casing slidably mounted on said shafts, a speed controlled governor mounted on said driven shaft and adapted to slide said casing on said shafts to vary said gear ratios, said governor comprising a member fixed on the driven shaft, a spring controlled plate carried by said governor and longitudinally movable relative to said driven shaft, a spring controlled ring slidable on the driven shaft, an arm pivoted on said fixed member and engaging said face plate, and an opposed arm adapted to engage said ring, and a weighted arm adapted upon predetermined speed of the driven shaft to force the face plate engaging arm against the face plate to slide said casing on said shafts and simultaneously to force said ring engaging arm against said ring to overcome its spring resistance and permit movement of said face plate by its said arm.

6. In a change speed device, a drive shaft and a driven shaft, a gear connection between said shafts of desired ratio, means for increasing said gear ratio including a gear casing slidable on said shafts, a governor responsive to the speed of the driven shaft to slide said casing on said shafts to progress said gear ratio successively from highest to lowest ratio, and means adapted to be influenced by accelerator controls to retard the action of the governor.

7. A change speed device as claimed in claim 5 wherein the governor control means comprise a hub screwed on the casing, a spring between the ring and said hub, and means for turning said hub to compress said spring to move said ring to swing said governor arms out of operating position.

8. An automatic speed transmission system comprising a drive shaft and a driven shaft, a gear connection of predetermined ratio between said shafts, a gear casing rotatable on said shafts, an auxiliary gear system adapted to develop a speed greater than the speed of the drive shaft, means for reducing the speed of said auxiliary gear system to the speed of the drive shaft and simultaneously to actuate said gear connections to move said driven shaft to produce a low speed, means adapted to lock said casing and auxiliary gear system against further rotation to produce a second speed, and means locking said casing to said driven shaft to produce high speed.

9. In a change speed device, a drive shaft and a driven shaft, an idler assembly connecting said shafts and rotatable independently thereof, means successively to limit and prevent rotation of said assembly counter to that of said drive shaft to establish low and second speeds, means to rotate said assembly with said driven shaft, and a governor responsive to the speed of the driven shaft to actuate said means successively.

10. In a change speed device, a drive shaft and a driven shaft, a slidable and independently rotatable housing overlying said shafts, a gear connection between said shafts within said housing, said gear connection including a gear rotatably mounted within said housing, means adapted to limit rotation of said housing counter to that of said drive shaft, said means including a slidable member, means adapted to be interengaged by said slidable member to hold said housing against rotation, and means to rotate said housing with said driven shaft.

11. In a change speed device, a drive shaft and a driven shaft, an independently rotatable housing overlying said shafts, a gear connection between said shafts within said housing, said gear connection including a gear rotatably mounted within said housing, means adapted to retard rotation of said housing counter to that of the drive shaft to produce a slow drive of the driven shaft, means to prevent the rotation of said housing counter to that of the drive shaft to increase the speed of rotation of said driven shaft, means to rotate said housing with said driven shaft to produce a direct drive, and a governor responsive to the speed of the driven shaft adapted to cause operation of said second and third named means.

12. In a change speed device, a drive shaft and a driven shaft, an independently rotatable housing overlying said shafts, a gear connection of desired ratio between said shafts within said housing, said gear connection including an independently rotatable gear within said housing, means adapted to retard rotation of said housing counter to that of the drive shaft to produce a slow drive of the driven shaft, means to prevent the rotation of said housing counter to that of the drive shaft to increase the speed of rotation of said driven shaft, means to rotate said housing with said driven shaft, a governor responsive to the speed of the driven shaft adapted to permit operative engagement by said second and third named means, and means adapted to be controlled by the operator for retarding the action of said governor.

13. In a change speed device, a drive shaft and a driven shaft, a gear connection of desired ratio between said shafts including an independently rotatable gear housing, means adapted to retard rotation of said housing counter to that of the drive shaft to produce a slow drive of the driven shaft, means to prevent the rotation of said housing counter to that of the drive shaft to increase the speed of rotation of said driven shaft, means to rotate said housing with said driven shaft, and said first named means including members adapted to prevent rotation of said driven shaft counter to that of said drive shaft.

14. In a change speed device, a drive shaft and a driven shaft, a freely rotatable housing overlying said shafts, a gear connection of desired ratio between said shafts within said housing, said connection including an independently rotatable gear within said housing, means adapted to retard rotation of said housing counter to that of the drive shaft to produce a slow drive of the driven shaft, means to prevent the rotation of said housing counter to that of the drive shaft to increase the speed of rotation of said driven shaft, means to rotate said housing with said driven shaft, and said housing including a one way clutch adapted to prevent rotation of said driven shaft faster than said drive shaft.

15. In a change speed device, a drive shaft and a driven shaft, a slidable and independently rotatable housing overlying said shafts, a gear connection between said shafts within said housing, said gear connection including a gear rotatably mounted within said housing, means to limit rotation of said housing counter to that of said drive shaft, said means including a slidable member, clutch plates on said housing and said member adapted to be engaged on longitudinal movement of said housing, a speed governor rotated by said driven shaft, a member slidably carried by said governor, clutch plates on said member and said housing, a compressible member separating said housing and said member whereby said governor compels longitudinal movement of said housing and said first named member and the interengagement of said first named clutch plates before said second named clutch plates are engaged.

16. In an automatic change speed transmission having a speed governor effecting ratio changes, a member adapted to dominate said governor, means adapted to carry said member into position to dominate said governor, means adapted to carry said member out of governor dominating position, one of said means including a source of fluid under pressure adapted to actuate said means, a valve in control thereof, members adapted to be actuated by the operator to operate said valve whereby a desired pressure is exerted on said governor, and means for automatically restoring said valve when the desired acceleration or deceleration has been effected.

17. In an automatic change speed transmission having a speed governor effecting ratio changes, a member adapted to dominate said governor, means adapted to carry said member into position to dominate said governor and means adapted to carry said member out of governor dominating position, one of said means including suction creating means to prevent actuation of said means, a valve in control thereof, means adapted to be actuated by the operator to operate said valve, and means for automatically restoring said valve when said member is exerting a desired control of said governor.

18. In an automatic change speed transmission having a fixed casing and a speed governor therein effecting gear ratio changes, a toothed thrust member threaded on said casing, a freely compressible member in contact with said governor and said thrust member, a rack adapted to actuate said thrust member, and means to actuate said rack in either direction to increase or decrease the pressure on said governor dominating member.

19. In an automatic change speed transmission system having a speed governor effecting gear ratio changes, means adapted to retard the action of said governor whereby said gear ratio changes are effected at higher speeds thereof, a member in control of said retarding means, a source of power to actuate said member, a control for said power, and operator actuated means whereby said power is applied to said retarding control member to vary normal acceleration and deceleration as desired.

20. In an automatic change speed transmission having a speed governor effecting gear ratio changes, a member adapted to dominate said governor, a spring normally preventing said member from dominating said governor, means adapted to carry said member into position to dominate said governor including a source of power to actuate said means against the tension of said spring and a control for said power adapted to be actuated by the operator to cause said member to dominate said governor to vary the normal acceleration and deceleration as desired.

21. In an automatic change speed transmission system having a speed governor effecting gear ratio changes, means adapted to retard the action of said governor whereby said gear ratio changes are effected at higher speeds thereof, a member in control of said retarding means, a source of power to actuate said member, operator actuated controls for said power, and means for automatically positioning said operator controls to be re-actuated by the operator when the desired acceleration or deceleration has been effected.

22. In an automatic change speed transmission system having a speed governor effecting gear ratio changes, means adapted to retard the action of said governor whereby said gear ratio changes are effected at higher speeds thereof, a member in control of said means, a mechanism to actuate said member including a power source, a cylinder, said member having a piston disposed in said cylinder, a valve connecting said cylinder to said power source, controls adapted to be actuated by the operator to operate said valve to admit power to move said piston, said members including a rod connected to said valve, a lever pivotally connected to said rod, and means connected to said member to restore said valve when the desired acceleration or deceleration has been effected as represented by movements of said operator controlled members.

23. In an automatic change speed transmission system having a speed governor effecting gear ratio changes, means adapted to dominate the action of said governor whereby said gear ratio changes are effected at higher speeds thereof, a member in control of said means, means for actuating said member including a cylinder, said member having a piston portion within said cylinder, a fluid pressure system connected to said cylinder to actuate said piston, a valve in control of said system, operator controls to actuate said valve, and means for restoring said valve to permit said valve to be reactuated when the desired acceleration or deceleration has been effected.

24. In an automatic change speed transmission system having a speed governor effecting gear ratio changes, means adapted to dominate the action of said governor whereby said gear ratio changes are effected at higher speeds thereof, a member in control of said means, means for actuating said member including a cylinder, said member having a piston portion within said cylinder, a fluid pressure system connected to said cylinder to actuate said piston, a valve in control of said system, operator controls to actuate said valve, means for restoring said valve to permit said valve to be reactuated when the desired acceleration or deceleration has been effected, and means for restoring said piston when said operator controls are restored to inoperative position.

25. In an automatic change speed transmission having a speed governor effecting gear ratio changes, means adapted to dominate said governor, said means including a thrust member adapted to bear resiliently against said governor and a member adapted to cause said thrust member to bear with variable pressures against said governor, a spring normally holding said member in a desired position, fluid operated means for carrying said member against the influence of said spring, and means controlled by the operator for actuating said fluid controlled means, said means including a valve and means with said members permitting said valve to be reactuated by said operator.

26. In an automatic change speed transmission system having a speed governor effecting gear ratio changes, means adapted to dominate the action of said governor whereby said gear ratio changes are effected at selected speeds thereof, a member in control of said dominating means, means for actuating said member and means adapted to prevent the actuation of said member including a cylinder, said member having a piston portion within said cylinder, a vacuum system connected to said cylinder disposed to actuate said piston, a valve in control of said system, operator controls for said valve, and means for restoring said valve when the desired acceleration or deceleration has been effected.

27. In an automatic change speed transmission system having a speed governor effecting gear ratio changes, means adapted to retard the action of said governor whereby said gear ratio changes are effected at higher speeds, a member in control of said means, a compressible member adapted to actuate said member, means adapted to prevent the actuation of said member including a cylinder, said member having a piston portion within said cylinder, a suction system connected to said cylinder disposed to actuate said piston counter to said compressible member, a valve in control of said system, and operator controls for said valve.

28. In a change speed device, a drive shaft and a driven shaft, an idler assembly connecting said shafts, said assembly including portions slidable and independently rotatable in relation to said drive shafts, means adapted successively to limit and prevent rotation of said portions counter to that of said drive shaft to produce low and second speeds respectively, means to rotate said portions with said driven shaft, a governor responsive to the speed of the driven shaft, and said governor being adapted to bring said portions and said means into operative relation.

29. In a change speed device, a drive shaft and a driven shaft, an idler assembly connecting said shafts, said assembly including portions slidable and independently rotatable in relation to said drive shafts, means adapted successively to limit and prevent rotation of said portions counter to that of said drive shaft to produce low and second speeds respectively, means to rotate said portions with said driven shaft, and means to bring said portions and said means into operative relation.

30. In a change speed device, a drive shaft and a driven shaft, an idler assembly connecting said shafts, said assembly including portions slidable and independently rotatable in relation to said drive shafts, means adapted successively to limit and prevent rotation of said portions counter to that of said drive shaft to produce low and second speeds respectively, means to rotate said portions with said driven shaft, and means to bring said portions and said means into operative relation, and operator controlled means for varying the normal action of said actuating means.

31. In a change speed device, a drive shaft and a driven shaft, an idler assembly connecting said shafts, said assembly including portions slidable and independently rotatable in relation to said drive shafts, means adapted successively to limit and prevent rotation of said portions counter to that of said drive shaft to produce low and second speeds respectively, means to rotate said portions with said driven shaft, a governor responsive to the speed of the driven shaft, means to bring said portions and said means into operative relation, and means to cause said governor to influence said first named means before influencing said second named means.

32. In a change speed device, a drive shaft and a driven shaft, an idler assembly connecting said shafts, said assembly including portions slidable and independently rotatable in relation to said drive shafts, means adapted successively to limit and prevent rotation of said portions counter to that of said drive shaft to produce low and second speed respectively, means to rotate said portions with said driven shaft, a governor responsive to the speed of the driven shaft, said governor being adapted to bring said portions and said means into operative relation, and operator controlled means for varying the normal action of the governor.

33. In a change speed device, a drive shaft, a driven shaft, an idler assembly connecting said shafts, said assembly including independently rotatable portions, means successively to limit and prevent rotation of said portions counter to that of said drive shaft, said limiting means including a gear train, a clutch adapted to connect said train and said portions when said portions are rotated counter to said drive shaft, a member adapted to interlock with said drive shaft, and said train being adapted to rotate said member at a speed greater than said drive shaft to ensure the desired interlock and to rotate said driven shaft to provide a low forward speed.

34. In an automatic change speed transmission having a fixed casing and a speed governor therein responsive to the speed of the driven shaft and effecting ratio changes, a thrust member mounted on said casing for movement in desired relation to said governor, compressible means to oppose the action of said governor and being under the influence of contact with said thrust member, and means to move said member to increase or decrease the resistance of said compressible means to said governor.

35. In a transmission for a prime mover having a throttle and a control, power means to operate said control, a valve to control said power means, a lever actuating said valve, a movable fulcrum for said lever positioned by said power operated means, and means to actuate said lever on movement of said throttle so that said power means is adjusted proportionately to throttle movement.

36. In an automatic change speed transmission to connect the drive and driven shafts of a prime mover having a throttle, means responsive to the speed of said driven shaft to control of ratio changes, means to resiliently oppose the action of said speed responsive means, said last-named means including a source of power, a valve control for said source of power, said valve control being operatively connected to said throttle to be actuated on movement of said throttle to vary the opposition of said resilient means to said speed responsive means in relation to the position of said throttle as indicative of the drive shaft torque.

37. In a change speed device, a drive shaft, a driven shaft, an idler assembly connecting said shafts and rotatable independently thereof, means to limit retrograde rotation of said assembly in predetermined ratio to said drive shaft, means to hold said assembly against rotation, means to rotate said assembly with said driven shaft and means responsive to the speed of said driven shaft to actuate said second and third-named means in predetermined order.

38. In a change speed device for a throttle controlled prime mover of a vehicle, a drive shaft, a driven shaft, an idler assembly connecting said shafts and rotatable independently thereof, means to limit retrograde rotation of said assembly in predetermined ratio to said drive shaft, means to hold said assembly against rotation, means to rotate said assembly with said driven shaft and means to actuate said second and third means in predetermined order in relation to the vehicle speed and to the position of said throttle.

JESSE W. HALE.